United States Patent
Ort

[15] 3,677,158
[45] July 18, 1972

[54] MECHANISM FOR SYNCHRONIZING OPERATION OF A CAMERA SHUTTER AND A MECHANICALLY ACTUATED FLASH DEVICE

[72] Inventor: Wolfgang Ort, Stuttgart-Bad Cannstatt, Germany

[73] Assignee: Eastman Kodak Company, Rochester, N.Y.

[22] Filed: Oct. 29, 1970

[21] Appl. No.: 86,528

[30] Foreign Application Priority Data

Nov. 3, 1969 Germany .................. P 19 55 080.2
Nov. 3, 1969 Germany .................. G 69 42 571.4

[52] U.S. Cl. .................................................. 95/11.5
[51] Int. Cl. .................................................. G03b 9/70
[58] Field of Search .................................. 95/11.5, 53, 59

[56] References Cited

UNITED STATES PATENTS

| | | | |
|---|---|---|---|
| 3,051,066 | 8/1962 | Lareau et al. | 95/11.5 |
| 2,051,225 | 8/1936 | Riddell | 95/59 X |
| 3,033,092 | 5/1962 | Ernisse et al. | 95/11.5 X |

*Primary Examiner*—John M. Horan
*Attorney*—Robert W. Hampton and Leonard W. Treash, Jr.

[57] ABSTRACT

A member is positioned to act as a stop on shutter blade travel thus controlling camera exposure time. The member has a normal position and a flash position to which it is moved by the mounting of a flash device. In the flash position the member permits increased shutter travel thus increasing exposure time and it further acts as a linkage transmitting energy from the shutter blade to actuate a mechanically operable flash device.

3 Claims, 5 Drawing Figures

WOLFGANG ORT
INVENTOR.

ATTORNEYS

Patented July 18, 1972

WOLFGANG ORT
INVENTOR.

BY *Leonard W. Treash*
*R.W. Hampton*

ATTORNEYS

MECHANISM FOR SYNCHRONIZING OPERATION OF A CAMERA SHUTTER AND A MECHANICALLY ACTUATED FLASH DEVICE

CROSS-REFERENCE TO RELATED APPLICATION

Reference is made to commonly assigned, copending U.S. Pat. application Ser. No. 765,926 entitled PHOTOGRAPHIC APPARATUS FOR USE WITH FLASH UNITS HAVING INDIVIDUAL STRIKER ELEMENTS, filed Oct. 8, 1968, in the name of David E. Beach, now U.S. Pat. No. 3,576,155.

BACKGROUND OF THE INVENTION

1. Field of the Invention

The present invention relates to photographic cameras and camera mechanisms usable with flash devices employing mechanically ignitable flash lamps and more particularly, to a mechanism for synchronizing camera shutter operation and the actuation of such flash devices.

2. Description of the Prior Art

It is well known in the photographic art to use electrically fired flash devices to supplement the natural light available for picture taking. While electrically fired flash devices have provided generally satisfactory results, it has proven difficult to design firing systems which are economical of manufacture and have the high reliability desirable in this application. Battery deterioration and corrosion of electrical contact surfaces are the typical causes acting to reduce the dependability of flash photography, all to the exasperation of the camera user.

To provide for more dependable flash photography by obviating the need for inherently troublesome electric energy sources and circuits, percussively ignitable flash lamps have recently been developed.

Such lamps and cameras for receiving and actuating them are disclosed in U.S. Pat. application Ser. No. 765,926. In this application a percussively ignitable flash lamp is disclosed which can be assembled in a unit with a percussion striker which is held in a releasable, pre-energized condition. A camera mechanism receives the unit and releases the striker to effect ignition of the lamp. With this structure cameras need not be provided with strikers, which may jar the camera on impact, and percussive elements do not have to protrude outside of the unit where they can be actuated accidentally. Additionally, the movement of the unit's striker provides a mechanically sensible change in the unit on firing which can provide the basis for a fired bulb indicating system.

In more sophisticated improvements of the basic invention disclosed in the Beach application mentioned above, a sensing probe or finger engages the pre-energized striker to sense its condition. This sensing member may be moved into such engagement in response to receipt of a flash unit or upon partial depression of the shutter trigger as controlled by receipt of the flash unit. In either case the sensing member is prevented from moving above the camera casing where it could be damaged when no flash unit is in place.

Flash exposures in cameras with fixed shutter speeds are commonly made at a speed slower than that used for daylight pictures, for example, one-thirtieth of a second as compared to one-sixtieth of a second. It is known to make this change automatically in response to insertion of a flash device in a camera socket by removing a stop from the path of an impact shutter.

SUMMARY OF THE INVENTION

It is an object of the present invention to provide a mechanism for adjusting a camera exposure time for flash and synchronizing operation of a camera shutter and a mechanically operable flash which mechanism is simple of design, dependable of operation, and inexpensive of manufacture.

This and other objects are accomplished by a design in which a shutter stop mechanism giving a short exposure time in daylight is moved from the path of a timing portion of the shutter in response to receipt of a flash unit in the camera into the path of a flash driver. The stop mechanism transfers force from the flash actuator to fire a mechanically ignitable flash.

In a preferred embodiment, the flash driver is a second portion of the shutter, deriving flash actuating energy from that provided for shutter opening actuation.

It is also a feature of the invention to use the same stop mechanism to control the position of a flash ignition member in response to flash unit receipt on a camera.

The invention and its objects and advantages will become more apparent in the detailed description of the preferred embodiment presented below.

DESCRIPTION OF THE PREFERRED EMBODIMENT

Because photographic cameras are well known, the present description will be directed in particular to elements forming part of, or cooperating more directly with, apparatus in accordance of the present invention. It is to be understood that camera elements not specifically shown or described herein may take various forms known to those skilled in the art.

Figure 1:
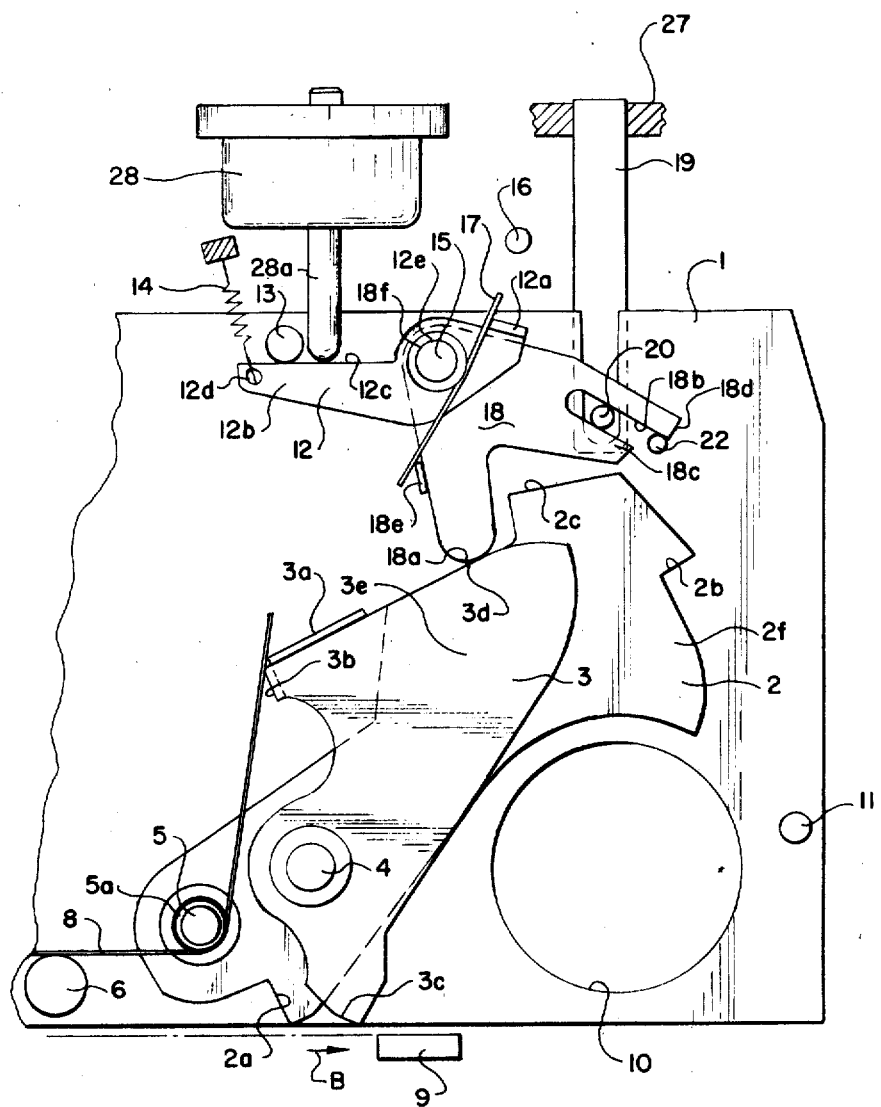
FIG. 1 is a front elevational view of a camera with portions removed to better illustrate the present invention and the camera mechanisms with which it interacts. The camera elements are shown in their mid-operative positions for the condition where no flash unit is mounted.
Figure 2:
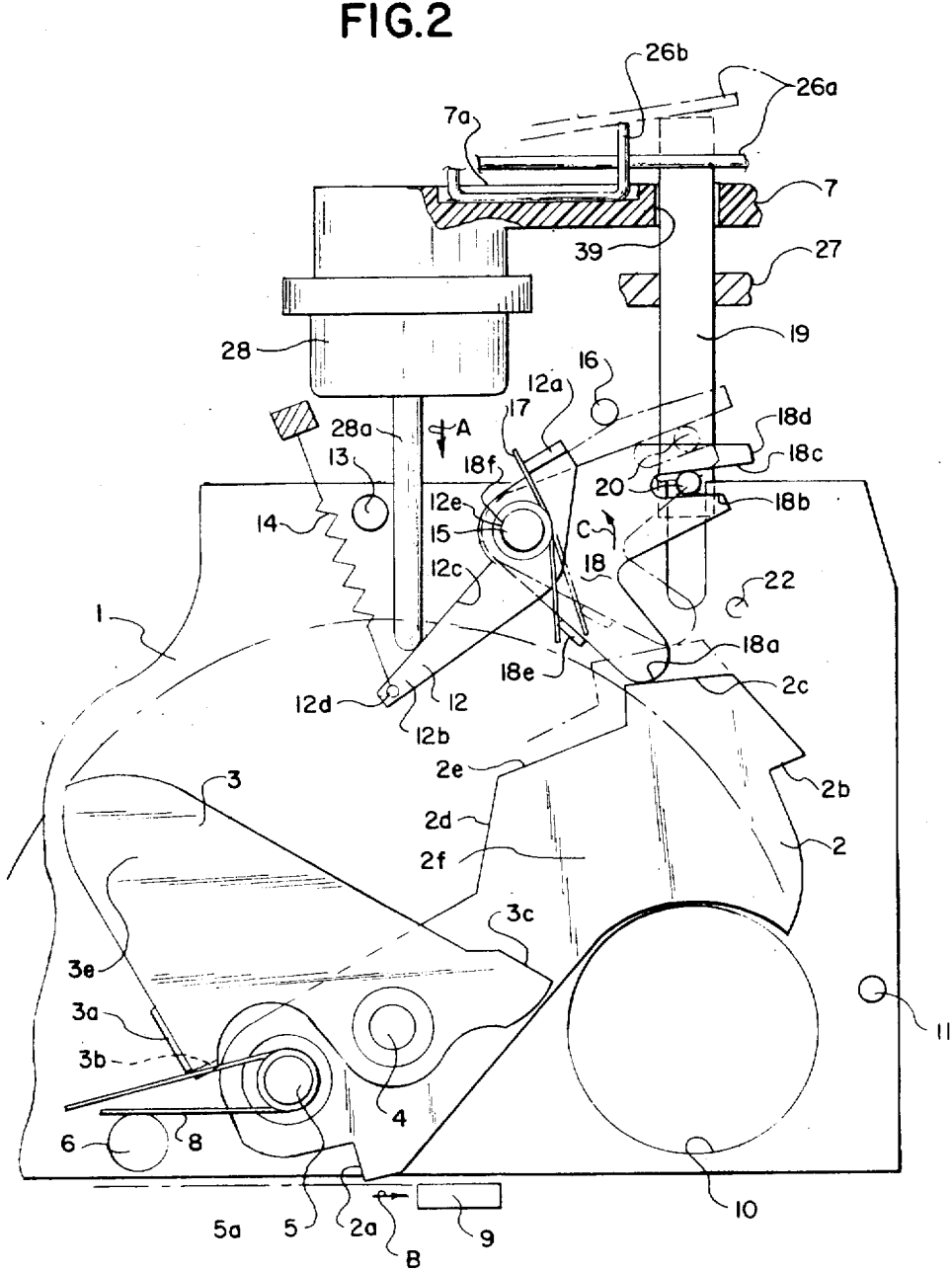
FIGS. 2 and 3 correspond to FIG. 1 but illustrate the positions of the camera elements with a flash unit mounted in mid-operative and pre-operative conditions, respectively.
Figure 3:
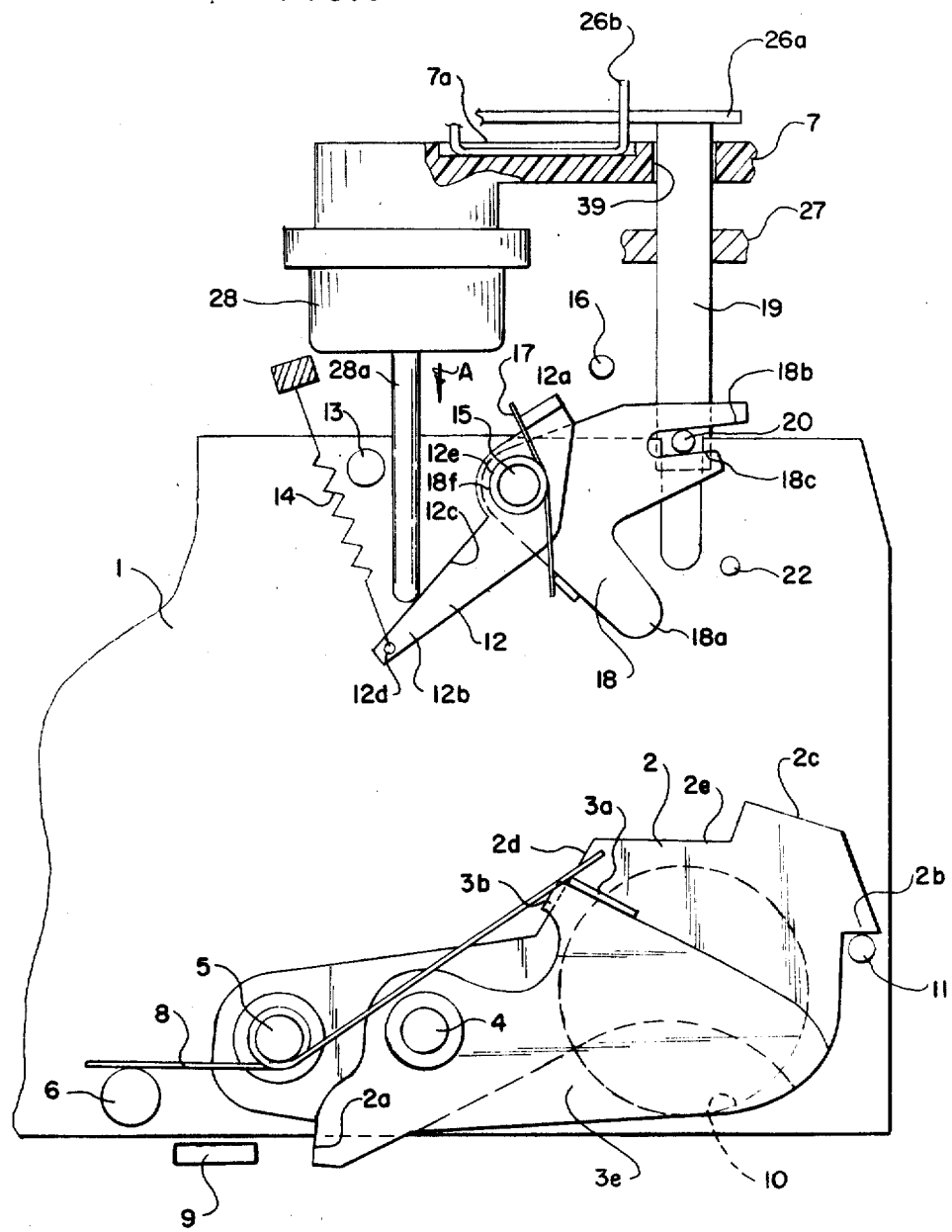

Referring to FIGS. 1-3, the presently preferred embodiment of the invention is illustrated with cooperating camera elements.

A support plate 1 is rigidly fixed within the camera body and includes an aperture 10 through which light rays pass to expose sensitized film (not shown). Light path control is accomplished by a shutter assembly comprising a main shutter blade 2 and an auxiliary blade 3.

The preferred form for main shutter blade 2 is shown most clearly in FIG. 2 and comprises a drive extension 2a, a travel limit extension 2b, a flash stop surface 2c, an auxiliary blade contact edge 2d, a no-flash stop surface 2e, and a main body section 2f. Main shutter blade 2 is pivotally mounted to support plate 1 by means of an eyelet rivet 5 and is disposed to partially cover aperture 10 wherein the closed position as illustrated in FIG. 3.

The preferred form for auxiliary blade 3 is also shown most clearly in FIG. 2, and comprises a body portion 3e, a spring tab 3a extending forwardly of body portion 3e, a main blade drive tab 3b extending rearwardly of body portion 3e and a drive extension 3c. Auxiliary blade 3 is pivotally mounted to main blade 2 by means of an eyelet rivet 4 and is disposed to cooperate with main blade 2 to completely cover aperture 10 for the closed position as illustrated in FIG. 3. Main blade drive tab 3b extends beyond auxiliary blade contact edge 2d to limit clockwise rotation of auxiliary blade 3 relative to main blade 2.

A spring 8 is mounted on a ring extension 5a of eyelet rivet 5 and is tensioned between spring tab 3a and an abutment or stop pin 6 to urge auxiliary blade 3 in a clockwise direction. Stop pin 6 is rigidly fixed to support plate 1.

A blade travel stop pin 11 is rigidly fixed to support 1 and is disposed to engage travel limit extension 2b to prevent clockwise movement of main blade 2 beyond the aforementioned closed position (see FIG. 3).

The shutter assembly is biased to the closed position by spring 8 urging auxiliary blade 3 against contact surface 2d of main blade 2 which is thereby caused to abut against blade travel stop pin 11. Actuation of the shutter assembly is accomplished by a pre-energized shutter driver 9 of the type commonly known in the art for actuating impact-type shutters. Shutter driver 9 moves rapidly upon release in direction B to engage drive extensions 2a and 3c thereby energizing the shutter assembly for rotation in a counterclockwise direction.

A preferred flash and speed control assembly comprises a control member, for example, a stop lever 18 and a positioning lever 12. In preferred form, stop lever 18 is generally V-shaped and comprises a stop arm 18a, a recess or slot 18b in a force transfer arm 18c, a stop finger 18d, a spring retention tab 18e extending forward of stop leg 18a, and a pivot area 18f located at the bottom of the V.

The preferred form for positioning lever 12 comprises a stop leg engaging tab 12a, a force arm 12b, a contact surface 12c, a spring aperture 12d, and a pivot area 12e.

Stop lever 18 and positioning lever 12 are pivotally mounted to support plate 1 by a rivet 15 with positioning lever 12 forward of stop lever 18. Stop lever engaging tab 12a extends rearwardly and beyond the edge of stop lever 18 to permit engagement therewith.

A weak spring 17 is mounted upon a ring extension of rivet 15 and is tensioned between tab 12a and spring tab 18e to urge tabs 12a and 18e to rotate toward one another. Such relative movement of tabs 12a and 18e is arrested when tab 12a engages the edge of pivot area 18f.

A stop pin 22 is rigidly fixed to support plate 1 and is disposed to engage stop finger 18d thereby limiting clockwise movement of stop lever 18 as illustrated in FIG. 1.

A stop pin 13 is rigidly fixed to support plate 1 and is disposed to engage contact surface 12c thereby limiting clockwise movement of positioning lever 12 as illustrated in FIG. 1. A weak spring 14 is attached to the camera body at one end and spring aperture 12d at the other and is tensioned to urge positioning lever 12 in a clockwise direction toward stop pin 13.

The disposition of the flash and speed control assembly relative to the shutter assembly is discussed hereinafter as a part of the discussion of intended operation.

A receptacle 28 is rigidly mounted to the camera body for releasably receiving a mechanically actuable flash unit. The cooperating receptacle and flash unit may be selected from various forms known in the art. A pin member 28a is slidably mounted in the base of receptacle 28 and is disposed to engage contact surface 12c of positioning lever 12. Mounting of a flash unit displaces pin member 28a downwardly to the flash position shown in FIG. 2 thereby driving positioning lever 12 in a counterclockwise direction against the urging of spring 14.

Figure 4:
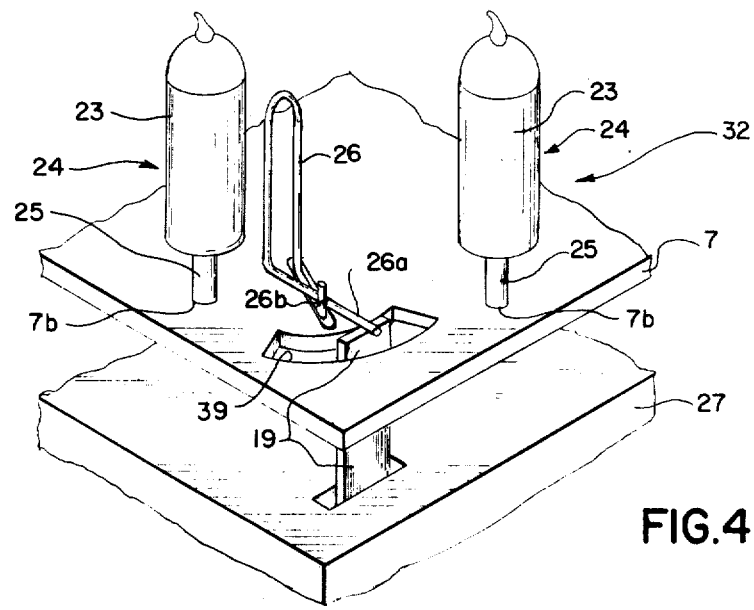
FIG. 4 is a perspective view of a multilamp flash unit utilizing percussively ignitable flash lamps illustrating the elements in their positions prior to actuation. Portions have been removed to more clearly show the position of those elements cooperating with the present invention.
Figure 5:
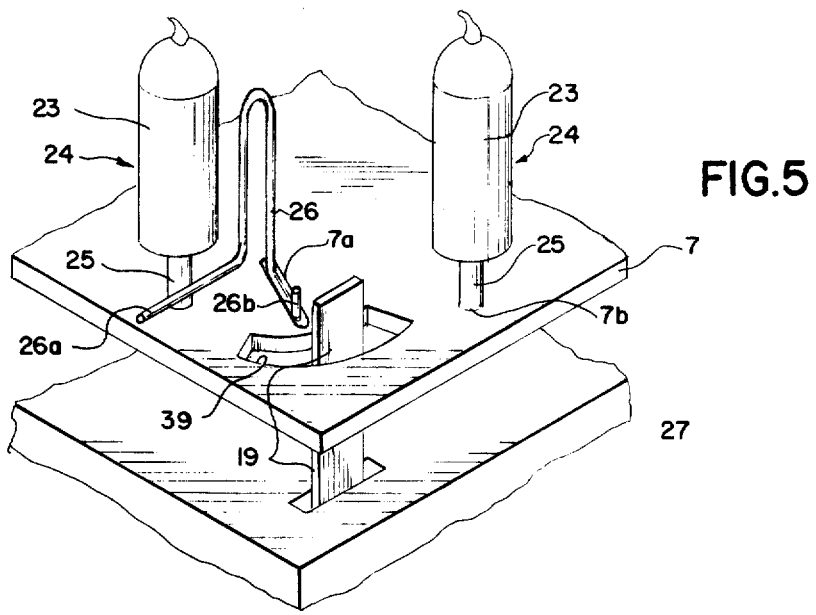
FIG. 5 corresponds to FIG. 4 but illustrates the position of the elements at the time of flash lamp ignition.

Portions of a flash unit suitable for use with the invention are illustrated in FIGS. 3-5. Referring to FIGS. 4 and 5, a base 7 is provided with apertures 7b in which percussively fired flash lamps 24 are securely mounted. Flash lamps 24 are comprised of a lamp envelope portion 23 and an ignition pin portion 25 which actuates the lamp upon being struck sharply. A torsion spring 26 is secured in a groove 7a of base 7. A striker end 26a of spring 26 is restrained behind an upturned end 26b under spring tension and is biased to move against ignition pin 25 upon release. An access opening 39 is provided in base 7 to permit entry of an external actuating member to dislodge striker end 26a. Actuation occurs when striker end 26a is raised above end 26b and is thus freed to move under spring tension to sharply strike ignition pin 25.

A flash actuating means, for example, an ignition slide bar 19 is mounted for longitudinal movement in a track defined by guide member 27 and is disposed relative to receptacle 28 to permit entry of access opening 39 of a mounted flash unit (see FIG. 2). Guide member 27 is moulded to or otherwise secured to the camera body. A pin 20 is rigidly secured to ignition slide bar 19 and extends into slot 18b thereby coupling motion of stop lever 18 and said slide bar.

Because of the coupling, limits on the rotation of stop lever 18 serve also to limit the travel of ignition slide bar 19. A lower travel limit is imposed by aforementioned stop pin 22 in limiting clockwise rotation of stop lever 18.

The upper travel limit is determined by a stop pin 16 which engages the upper edge of stop lever 18 to arrest counterclockwise rotation. Stop pin 16 is rigidly secured to the camera body and is disposed to provide an upper travel limit assuring slide bar actuation of a mounted flash unit. For a flash unit of the form shown, the travel limit would preferably be set just beyond the upper extremity of end 26b to allow positive dislodging of striker end 26a.

NON-FLASH OPERATION

The intended operation of the present preferred embodiment is described for two modes of operation: the non-flash mode and the flash mounted mode.

FIG. 1 shows the mid-operative positions of the camera elements for operation without a flash mounted. The positions of the elements comprising the flash and speed control assembly remain the same throughout an operation in the non-flash mode. Since a flash unit is not mounted, pin 28a is not displaced into driving engagement with contact surface 12c. In the absence of driving force from pin 28a, positioning lever 12 is biased against stop pin 13 under the urging of weak spring 14. Stop lever 18 is biased by weak spring 17 to the position shown in FIG. 1 wherein further movement relative to positioning lever 12 is prevented by engagement with stop lever engaging tab 12a.

Camera operation is initiated when the operator effects release of shutter driver 9. Upon release shutter driver 9 moves rapidly in direction B striking drive extensions 2a and 3c. Under the impact of shutter driver 9, blades 2 and 3 are propelled in a counterclockwise direction until rotation is arrested by stop arm 18a as illustrated in FIG. 1.

At this point in the description, the structural requirements as to relative positioning of the shutter assembly and speed control assembly become more clearly apparent.

Rivet 5 and rivet 15 are aligned to cause stop arm 18a to engage non-flash stop surfaces 2e and 3d during operation in the non-flash mode. The alignment is preferably selected to orient the impact force vector slightly off the pivot point of stop lever 18 to produce clockwise torque. Clockwise rotation of stop lever 18 is prevented by stop pin 22, therefore, the stop lever remains rigid under impact. With the kinetic energy of the shutter assembly dissipated through impact with stop lever 18, a return to the closed position is accomplished through the urging of spring 8. A clockwise return torque is applied by spring 8 to auxiliary blade 3 and is transmitted to main blade 2 by main blade drive tab 3b. With blades 2 and 3 returned to the closed position, the photographic operation is complete.

Because of the short travel distance of the auxiliary blade 3, a short exposure time appropriate for daylight exposure is provided, for example, one-sixtieth of a second.

FLASH OPERATION

The pre-operative positions of the camera elements with a flash unit mounted are illustrated in FIG. 3. Base 7 of the flash unit displaces pin 28a downwardly to a lowered position. In the lowered position pin 28a forceably engages positioning lever 12 and against the bias of spring 14 maintains the positioning lever in the rotated position shown in FIG. 3. Weak spring 17 urges stop lever 18 in a counterclockwise direction thereby urging coupled ignition slide bar 19 upwardly. Motion of slide bar 19 and consequently stop lever 18 is arrested upon engagement of striker end 26a by the slide bar as illustrated in FIG. 2. Slide bar 19 and stop lever 18 are maintained in the pre-flash position under the bias of spring 17. In this position, the position of ignition slide bar 19 can be used to detect the presence or absence of striker end 26a and the result signalled to a camera operator as indicative of the condition of the corresponding flash lamp.

Operation is initiated by release of shutter driver 9 by the camera operator. Shutter driver 9 upon release moves in direction B (see FIG. 2) to strike drive extensions 2a and 3c. Under the impact of shutter driver 9, blades 2 and 3 rotate in a counterclockwise direction. With stop arm 18a rotated to the flash position illustrated in FIG. 2, the path of auxiliary blade 3 is not obstructed and rotation continues until spring 8 overcomes the kinetic energy of the auxiliary blade whereupon return motion under spring urging begins. This long path of the auxiliary blade provides a relatively long exposure time appropriate for flash picture taking, for example, one-thirtieth of a second.

Main blade 2 moves to engagement with stop lever 18 as illustrated in FIG. 2. With stop lever 18 in the pre-flash position, flash stop surface 2c strikes stop arm 18a. For the pre-flash position, the striking force of main blade 2 produces a counterclockwise torque, rotating stop lever 18. Through the coupling action of pin 20, ignition slide bar 19 is driven upwardly lifting striker end 26a above upturned end 26b, (see dashed line portion of FIG. 2). With striker end 26a dislodged from behind upturned end 26b actuation of the flash unit is effected as discussed hereinabove. Travel of ignition slide bar 19 and stop lever 18 is arrested upon engagement of stop pin 16 by the upper edge of the stop lever.

In returning to the closed position under the urging of spring 8, auxiliary blade 3 engages main blade 2 by means of main blade drive tab 3b. Subsequently, blades 2 and 3 remain in coupled engagement and are urged to the closed position illustrated in FIG. 3. With return to the closed position, blades 2 and 3 again cover aperture 10 and the film exposure is complete.

Thus, the same element, V-shaped stop lever 18, provides the necessary adjustable stop to allow automatic change in exposure time for flash and also transfers force from the shutter to the flash for synchronized flash actuation.

The invention has been described in detail with particular reference to preferred embodiments thereof, but it will be understood that variations and modifications can be effected within the spirit and scope of the invention.

I claim:

1. In a photographic camera having an aperture for exposure of sensitized film, a mechanism comprising:
    a. means for receiving a flash unit of the type having at least one lamp fireable by the application of mechanical force to the unit;
    b. a shutter assembly biased to a closed position in which the camera aperture is covered, said assembly being mounted within the camera to oscillate upon energization through a path to uncover the camera aperture for an exposure time related to the position of maximum travel from the closed position;
    c. shutter drive means for energizing said shutter assembly into motion through said path in response to camera user actuation;
    d. means for applying a mechanical force to a received flash unit in response to a mechanical energy input;
    e. means for providing flash actuation energy in timed relation to shutter assembly energization;
    f. a control member having
        1. a first position wherein said control member is disposed to limit the path of said shutter assembly establishing a first maximum travel position and a first exposure time,
        2. a second position permitting establishment of a second maximum travel position and a second exposure time different from said first exposure time, said second position being such that said control member is engageable by said flash actuation energy providing means; and
        3. means for transmitting mechanical energy from said flash actuation energy providing means to said mechanical force applying means to fire a lamp in a received unit; and
    g. means for moving said control member between its first and second positions.

2. In a photographic camera having an aperture for exposure of sensitized film, a mechanism comprising:
    a. means for receiving a flash unit of the type having at least one lamp fireable by the application of mechanical force to the unit;
    b. a shutter assembly biased to a closed position wherein the camera aperture is covered, said assembly being mounted within the camera to oscillate upon energization through a path to uncover the camera aperture for an exposure time related to the position of maximum travel from the closed position;
    c. shutter drive means for energizing said shutter assembly into motion through said path in response to camera user actuation;
    d. actuating means for supplying a mechanical force to a received flash unit in response to an energy input;
    e. a control member having stop means and means for transmitting mechanical energy and being moveable between a first position in which said stop means is disposed to limit the path of said shutter assembly establishing a first maximum travel position and a first exposure time, and a second position in which said stop means is disposed out of said path permitting a second maximum travel position and a second exposure time longer than said first exposure time, and in which second position said control member is disposed to be engaged by said shutter assembly during its operative motion and said force transmitting means is positioned to transmit mechanical energy received through such engagement to said actuating means to fire a lamp in a received unit; and
    f. means for moving said control member from the first position to the second position in response to receipt of a flash unit in said receiving means.

3. In a photographic camera having an aperture for exposure of sensitized film, a mechanism comprising:
    a. means for receiving a mechanically actuable flash unit;
    b. a shutter assembly including pivotally mounted first and second blades and resilient means biasing said first blade toward a closed position, said bias being transferred to the second blade by engagement therewith, said blades upon energization oscillating over an operative path to uncover the aperture for an exposure time related to the maximum travel position of said first blade;
    c. shutter drive means for energizing said blades into operative motion in response to camera user actuation;
    d. actuating means for supplying an actuating signal to a received flash unit in response to an energy input;
    e. a control member having a first position wherein said control member limits the operative path of said first blade establishing a first maximum travel position and a first exposure time and a second position wherein said control member is
        1. outside the path of said first blade permitting a second maximum travel position and a second exposure time longer than said first exposure time; and
        2. engageable by said second blade and movable in response to such engagement to synchronously transmit energy received through such engagement to said actuating means; and
    f. means for moving said control member from the first position to the second position in response to receipt of a flash unit in said receiving means.

* * * * *